(12) United States Patent
Jiang

(10) Patent No.: US 12,485,632 B2
(45) Date of Patent: Dec. 2, 2025

(54) TIRE REPAIR KIT SYSTEM AND METHOD WITH TRI-LAYER STRIPS

(71) Applicant: REXPAIR INDUSTRY LTD, Lansing, MI (US)

(72) Inventor: Yongbo Jiang, Lansing, MI (US)

(73) Assignee: REXPAIR INDUSTRY LTD, Lansing, MI (US)

( * ) Notice: Subject to any disclaimer, the term of this patent is extended or adjusted under 35 U.S.C. 154(b) by 92 days.

(21) Appl. No.: 18/310,916

(22) Filed: May 2, 2023

(65) Prior Publication Data

US 2023/0264441 A1  Aug. 24, 2023

Related U.S. Application Data

(63) Continuation-in-part of application No. 17/122,156, filed on Dec. 15, 2020, now Pat. No. 11,701,847.

(51) Int. Cl.
*B29C 73/08* (2006.01)

(52) U.S. Cl.
CPC ................... *B29C 73/08* (2013.01)

(58) Field of Classification Search
CPC ...................................................... B29C 73/08
See application file for complete search history.

(56) References Cited

U.S. PATENT DOCUMENTS

| | | | | |
|---|---|---|---|---|
| 3,783,715 A | * | 1/1974 | Niconchuk | B29C 73/08 81/15.7 |
| 4,424,295 A | * | 1/1984 | Van Ornum | B29C 73/22 525/232 |
| 4,930,377 A | * | 6/1990 | Lester | B29C 73/08 7/165 |

FOREIGN PATENT DOCUMENTS

GB  1023030 A  *  3/1966  ............. B29C 73/06

* cited by examiner

*Primary Examiner* — Vishal I Patel
(74) *Attorney, Agent, or Firm* — Mikhail Murshak

(57) ABSTRACT

A method for repairing a tire including: (a) providing a reamer, an insertion tool with a receiving opening, a tri-layer strip, and vulcanizing fluid; (b) inserting the reamer into a puncture hole of a tire to clear debris; (c) applying the vulcanizing fluid; (d) inserting the tri-layer strip into the insertion tool; (e) inserting the insertion tool and tri-layer strip into the puncture hole; wherein the insertion tool extends linearly from a first end of a center base of a first bilateral elongated tool member and a cavity encasing extending from a second end of the center base of the first bilateral elongated tool member in an opposite direction configured for housing a plurality of the tri-layer strips; and (f) removing the insertion tool from the puncture hole causing a center portion of the tri-layer strip to fold forming a four-layer seal within the puncture hole.

11 Claims, 16 Drawing Sheets

TIRE REPAIR KIT SYSTEM AND METHOD WITH TRI-LAYER STRIPS

CROSS REFERENCE TO RELATED APPLICATION

This Application is a continuation-in-part of U.S. patent application Ser. No. 17/122,156, titled "TIRE REPAIR KIT SYSTEM AND METHOD," and filed on Dec. 15, 2020, the disclosure of which is incorporated herein by reference in its entirety for all purposes.

TECHNICAL FIELD

The present disclosure relates generally to a tire repair kit system and method.

BACKGROUND

The statements in this section merely provide background information related to the present disclosure and may not constitute prior art.

Vehicles of all kinds provide individuals and society with the essential function of transportation, whether that be for the transportation of people or of goods and commerce. Invariably, when that mode of transportation is disrupted, the disruption of the essential function of that transportation has ripple down effects, such as delays of the delivery of the goods or people. Certain vehicles, such as automobiles, trucks, motorcycles, bicycles, and airplanes, utilize tires in order to move the vehicle. The tire holds air to give it the correct shape and firmness to carry the vehicle down a road or path and is typically made from rubber. Maintaining the correct air pressure is essential to keep the tire functioning properly.

When the outer rubber of the tire is punctured by a foreign object, such as a nail, glass, or other sharp object, the air leaks from out from the tire, thereby decreasing the air pressure in the tire and causing a "flat tire." A flat tire cannot properly carry a vehicle and causes damage to wheel mechanisms of the vehicle. Typically, the user of the vehicle can either replace the tire completely or "patch" the puncture and refill the air in the tire to restore the tire to a suitable air pressure.

There are various methods and devices that exist to patch or repair tires that have been punctured and damaged by foreign objects. U.S. Pat. No. 3,313,189 to Lewis discloses a system and method to provide for a repair product for the repair of tubeless tires using replacement containers or cartridges having a new supply of repair material for servicing the tool. The repair material is pulled out of the uppermost cartridge and the end cap is loosened so that the needle base is raised, and the end of the repair material is threaded through the opening and then through an eyelet. The needle is then inserted into the injury of the tire. Once the needle is withdrawn, the repair material is left in the injury and effects therein a permanent pneumatic seal.

U.S. Pat. No. 4,930,377 to Lester discloses a tire repair device and kit for inserting plugging material typically in the form of rubber coated twisted strands into a tire puncture. The device and kit are provided with one or more interchangeable tools such as a strand inserting needle, an awl, a knife, and screwdriver, said tools being interchangeably joinable with the handle of said device. In operation the awl is first joined with said handle and used to enlarge the puncture, if necessary. The inserting needle tool is then joined to the handle. The plug material is threaded into the open eye of the needle and inserted into the puncture. The inserting motion is limited by a stop bushing captive on said needle tool so that the ends of the strands are not drawn into the puncture. The stop also limits the withdrawal of the needle. After the strand has been inserted, the knife tool may then be attached to said handle and used to trim off any excess strand of material extending out of the puncture. The handle can be interchanged with the various repair tools, one at a time and in the order of which they are needed to repair the puncture.

U.S. Pat. No. 9,067,368 to Kerner discloses a tire repair kit which includes a plurality of tubes containing repair plugs, a clearance tool for clearing debris in a tire, and stopper to prevent air loss during the repair. The kit also includes a handle for storing the tools and for attaching the tools to make the appropriate repairs to the tire. The tire repair kit comes with interchangeable components to the repair base whereby the insertion tool, clearing tools, drills, or repair plugs can be attached to the base one at a time in the order in which they are needed. With the use of the insertion tool, the rubber impregnated plugs are inserted into the tire hole and the excess portions of the plugs are cut with a knife to create a tight safe seal of the hole.

U.S. Pat. No. 10,6111,103 to Park et al. discloses a tire repair tool assembly that includes a tool body, at least one tire plug, a plug storage cap, and a hollow tube. The tool body may have a first end and a second end opposite the first end, the tool body having a storage compartment within the tool body, the storage compartment having an opening at the first end. The plug storage cap may be coupled to the first end of the tool body. The hollow tube may be sized to receive a first end of the at least one tire plug within the hollow tube, the hollow tube extending from the second end of the tool body and having a tip distal from the second end of the tool body. The tire repair assembly may further include a tool body case having a closed end and an open compartment within the tool body case.

A need remains for improved tools, systems and methods to repair punctures in tires in terms of functionality, efficiency, effectiveness, and convenience.

SUMMARY

The present disclosure provides for a method for repairing a tire including: (a) providing a reamer, an insertion tool configured with a receiving opening, a rubber tri-layer strip, and vulcanizing fluid; (b) inserting the reamer into a puncture hole of a tire configured to clear the puncture hole of any debris and to generate rougher surface to increase surface area within the puncture hole to receive and bond the vulcanizing fluid; (c) applying the vulcanizing fluid to the puncture hole and the tri-layer strip; (d) inserting the tri-layer strip into the receiving opening of the insertion tool; (e) inserting the insertion tool with the tri-layer strip into the puncture hole to cause the tri-layer strip to fold into the puncture hole mixed with the vulcanizing fluid to bond the tri-layer strip and the tire; and (f) removing the insertion tool from the puncture hole causing a center portion of the tri-layer strip to fold forming a four-layer seal within the puncture hole, wherein the vulcanizing fluid causes an immediate reaction to bond the tri-layer strip to the tire.

In an example, the cutting tool and the reamer are provided on opposite ends of a second bilateral elongated tool member extending linearly away from each other from a center base of the second bilateral elongated tool member and each of the cutting tool and the reamer are enclosed in a removable protective encasing. In one example, each end of the bilateral tool member includes a removable protective encasing. In another example, the tri-layer strip comprises a first layer and third layer formed of a soft vulcanized rubber; a second layer formed of a tensile rubber configured to structurally support the first layer and third layer and provided therebetween; and wherein the first layer and third layer react with the vulcanizing fluid to form a permanent bond between the tri-layer strip and the tire.

In yet another example, the tri-layer strip is cut after the insertion tool removal step to form four layers plugging the puncture hole to form a secure plug within the puncture hole. The vulcanizing fluid can be an adhesive comprising elastic polymers dissolved in a solution of a member selected from the group consisting of toluene, acetone, benzene, chloroform, heptane, and combinations thereof. The vulcanizing fluid can be provided in a dispersion tube or a spray bottle and applied to the tri-layer strip and puncture hole by spraying the vulcanizing fluid.

In a further example, the reamer extends linearly away from a first end of a center base of a second bilateral elongated tool member and a cavity encasing extends linearly away from a second end of the center base of the second bilateral elongated tool member in an opposite direction from the reamer configured for housing a plurality of rubber tri-layer strips and wherein the first elongated tool member and second elongated tool member are each include a removable protective encasings. The first bilateral elongated tool member and the second bilateral elongated tool member are each configured to be 130 mm in length and 12 mm in diameter. The vulcanizing fluid can be applied to the four-layer seal in the puncture hole. The insertion tool can also include a closed-forked tip.

The present disclosure further provides for a tire puncture repair tool kit comprising: (a) a reamer configured to clear debris from a puncture hole of a tire; (b) a plurality of tri-layer strips; wherein, each of the plurality of tri-layer strips includes a first layer and a third layer of soft vulcanized rubber, a second layer provided between the first layer and the third layer, the second layer including a tensile rubber providing structural support for the first layer and the third layer; (c) an insertion tool having a receiving opening configured to receive the rubber tri-layer strip during use, wherein the insertion tool extends linearly from a first end of a center base of a first bilateral elongated tool member and a cavity encasing extends from a second end of the center base of the first bilateral elongated tool member in an opposite direction from the insertion tool configured for housing a plurality of the tri-layer strips and the reamer extends linearly from a first end of a center base of a second bilateral elongated tool member and a cavity encasing extends from a second end of the center base of the second bilateral elongated tool member in an opposite direction from the reamer configured for housing a plurality of the tri-layer strips; (d) vulcanizing fluid; and (e) a case sized and shaped to hold elements (a)-(d).

In an example, the first bilateral elongated tool member and second bilateral elongated tool member are each provided in removable protective encasings. Each protective encasing can be sized to be 130 mm in length and 12 mm in diameter. The vulcanizing fluid can be provided in a dispensing tube. In a further example, the first and third layer of the tri-layer strip is configured to rapidly react with the vulcanizing fluid to form a permanent bond between the tri-layer strip and a tire during use. The insertion tool can be configured with a closed fork tip forming the receiving opening. The vulcanizing fluid can be an adhesive comprising elastic polymers dissolved in a solution of a member selected from the group consisting of toluene, acetone, benzene, chloroform, heptane, and combinations thereof. The kit may further include a cutting tool.

BRIEF DESCRIPTION OF THE DRAWINGS

The figures which accompany the written portion of this specification illustrate example embodiments and methods of use for the present disclosure.

The various embodiments of the present disclosure will hereinafter be described in conjunction with the appended drawings, wherein like designations denote like elements.

DETAILED DESCRIPTION

Figure 1:
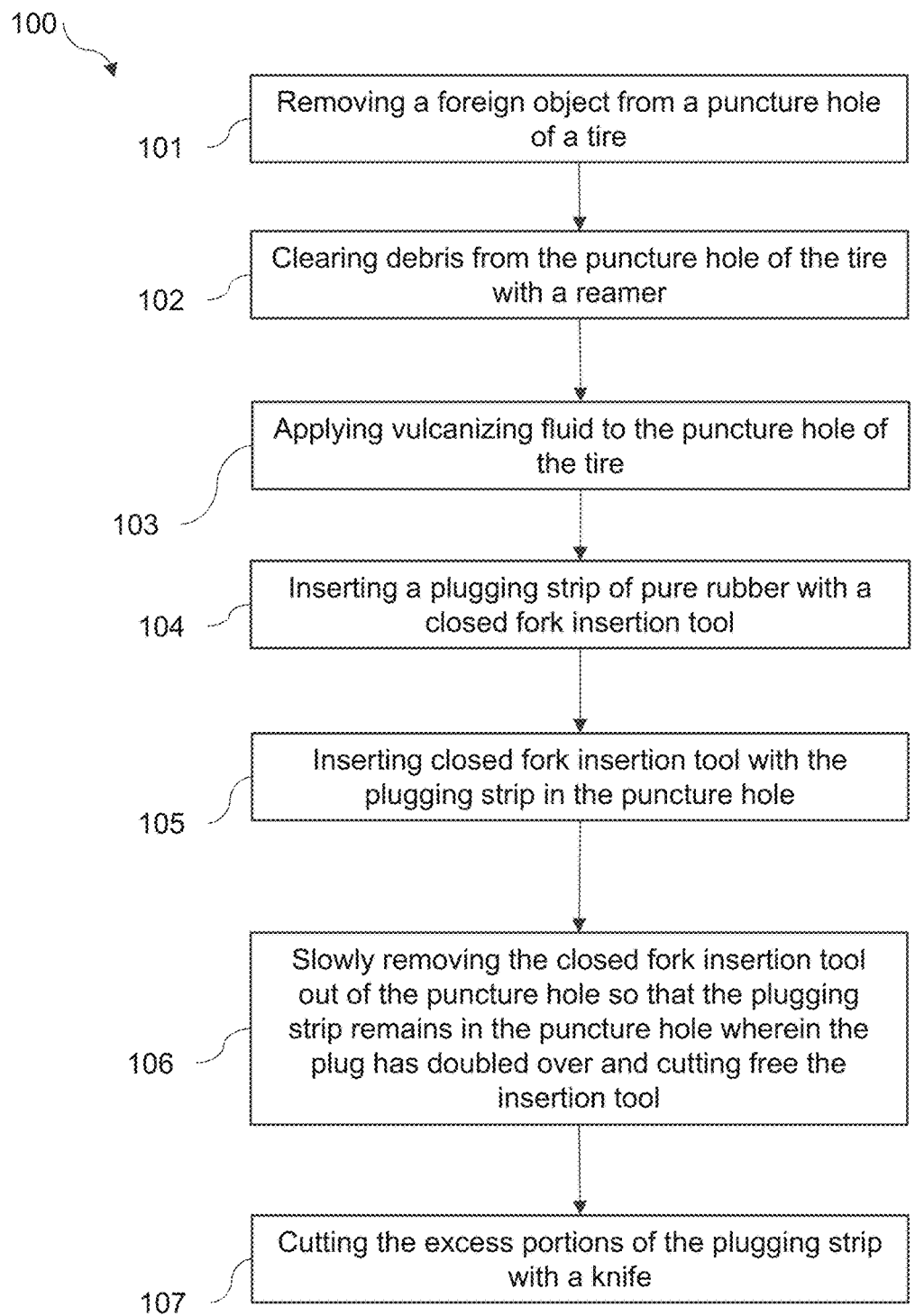
FIG. 1 illustrates a flow diagram of a process of repairing a puncture hole of a tire.
Figure 2A:
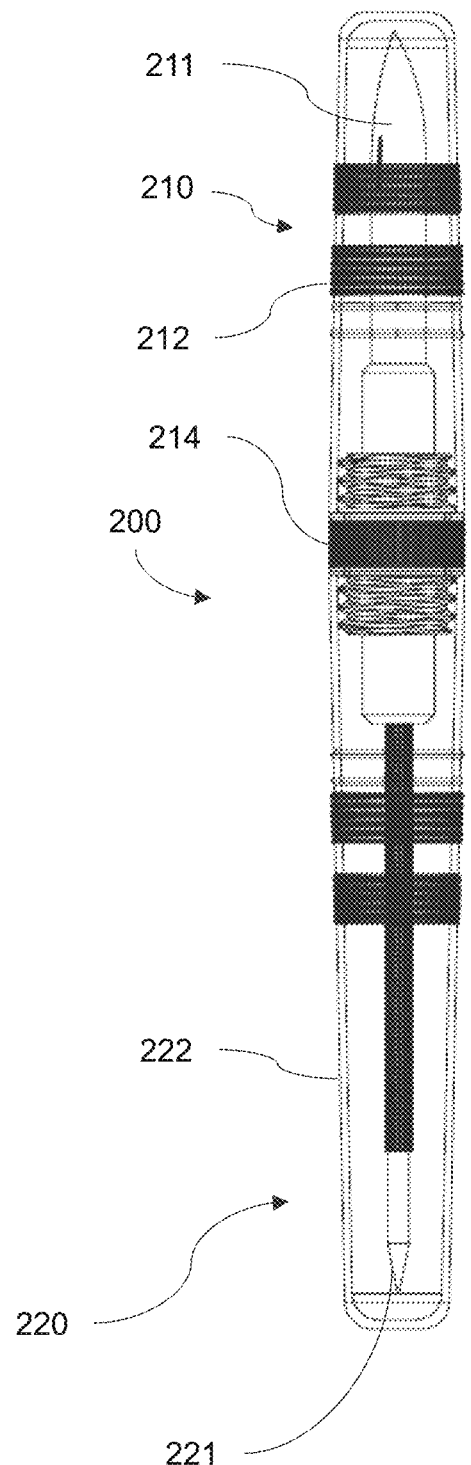
FIG. 2A illustrates an example schematic of a cross-sectional view of a first elongated tool member 200 configured with repair tools on each end and housed within a protective encasing.
Figure 2B:
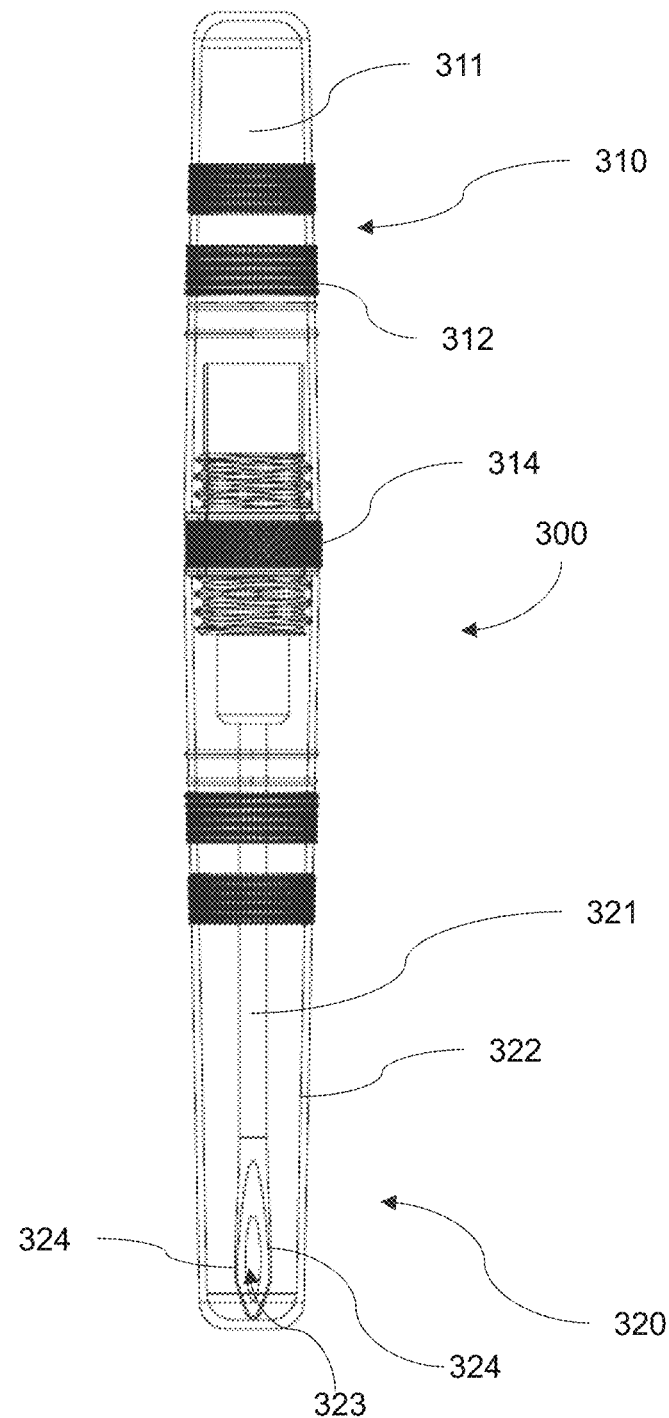
FIG. 2B illustrates an example schematic of a cross-sectional view of a second elongated tool member 300 configured with a repair tool and a cavity on each end and housed within a protective encasing.

The following description is merely exemplary in nature and is not intended to limit the present disclosure, application, or uses. It should be understood that throughout the drawings, corresponding reference numerals indicate like or corresponding parts and features.

Referring to FIGS. 1-16, the present disclosure provides for a tire repair method 100 and system, particularly through the use of a reamer tool 221, vulcanized fluid 600, a fully rubber plugging strip 400 and an insertion tool 321 or 721 having a receiving opening 323 to engage and insert a plugging strip 400. In an example, a bilateral tire repair kit 800 (FIG. 5) is provided that includes a dispensable tube of vulcanizing fluid 600, rubber plugging strips 400, and two elongated members 200 and 300. Member 300 encloses and houses an insertion tool 321, a receiving opening 323 for holding plugging strips 400. Member 200 encloses and houses a reamer 221 and a knife 211. It is further contemplated that kit 800 can include any insertion tool 720 and reamer 710 like those shown in FIG. 11.

Figure 5:
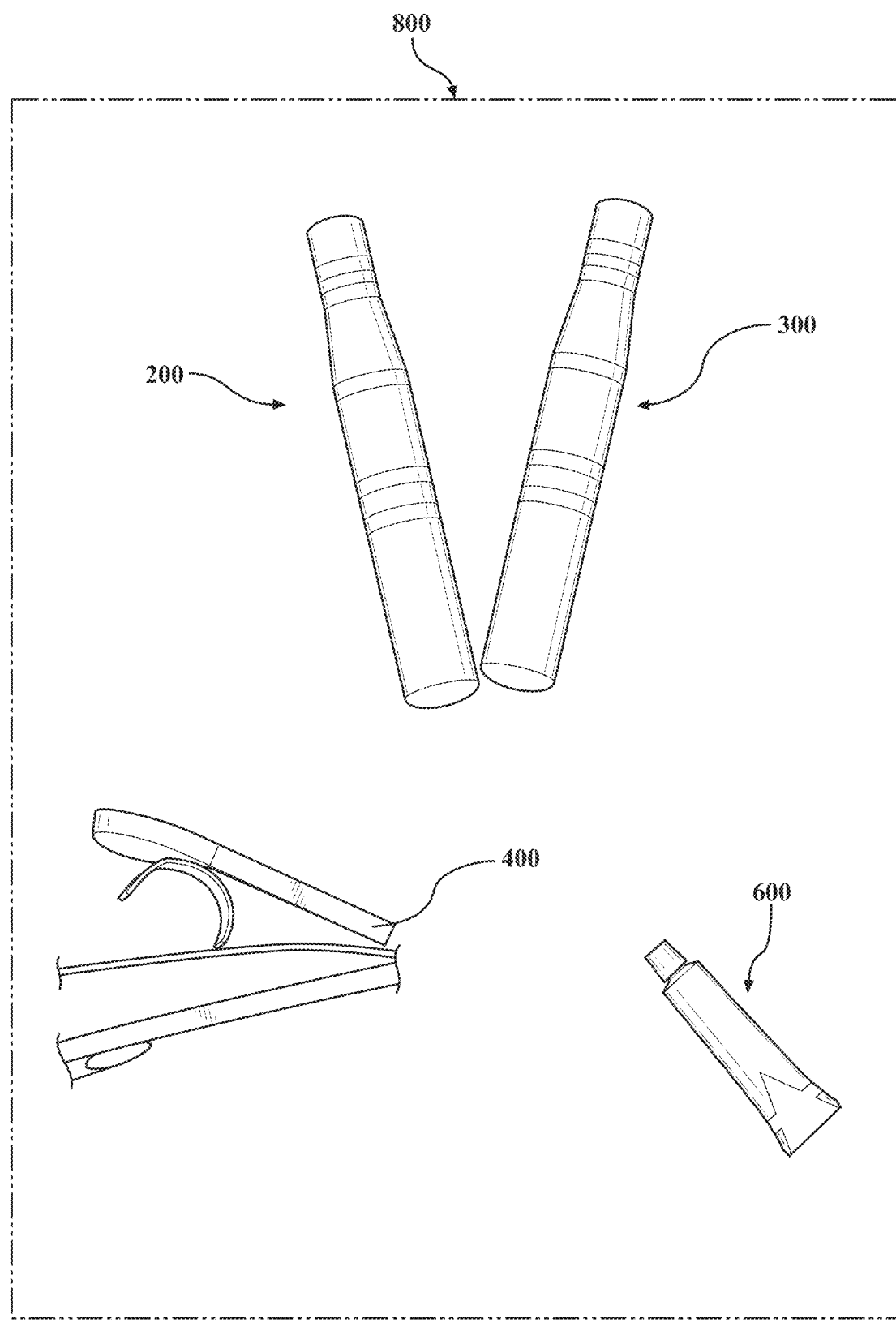
FIG. 5 illustrates a schematic of a repair tool kit including two elongated tool members housed in protective casings, fully rubber plugging strips and a dispensable tube of vulcanized rubber.
Figure 6:
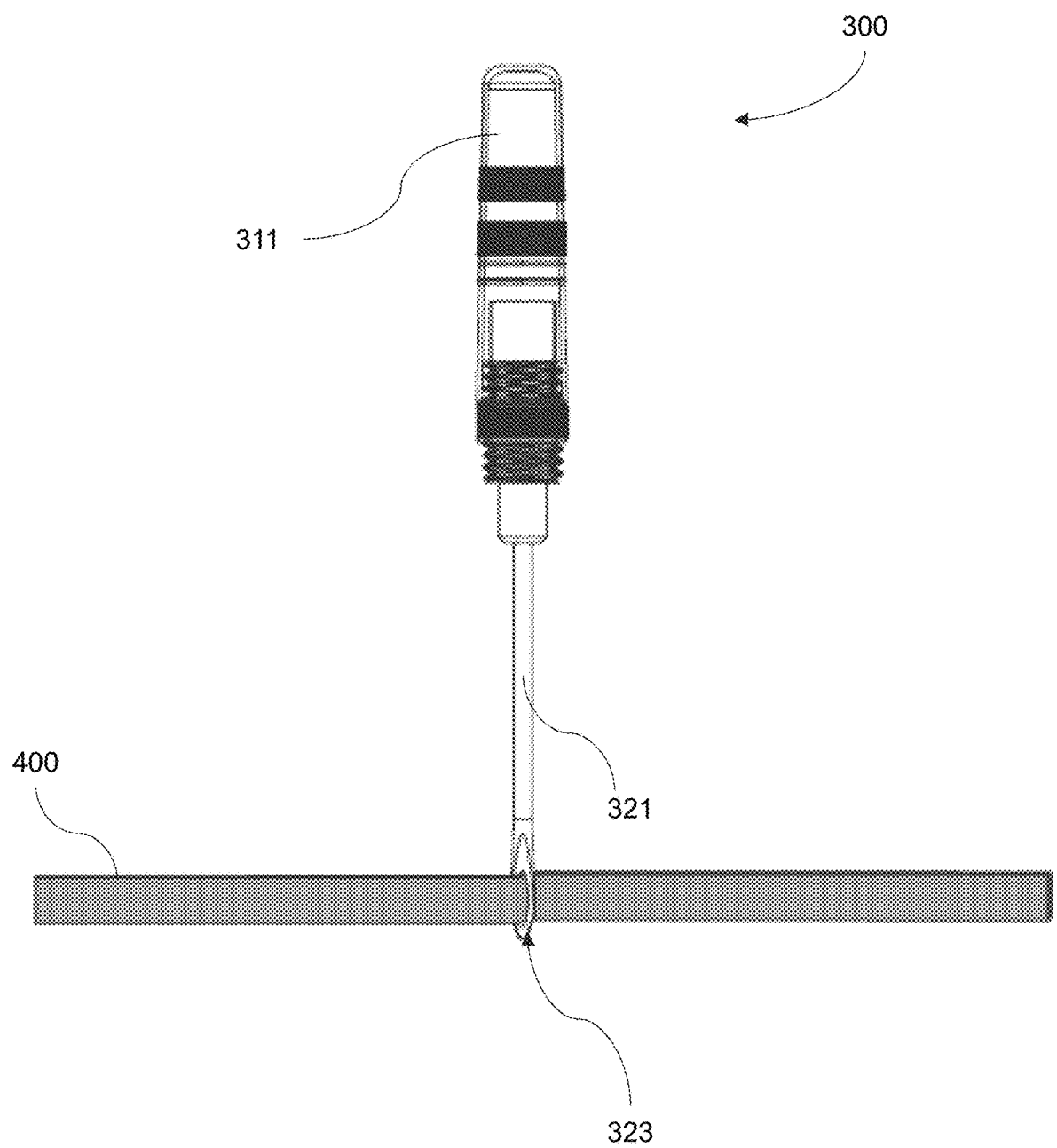
FIG. 6 illustrates a side view of an elongated tool member with an insertion tool and a plugging strip inserted within a receiving opening of the insertion tool.
Figure 7:
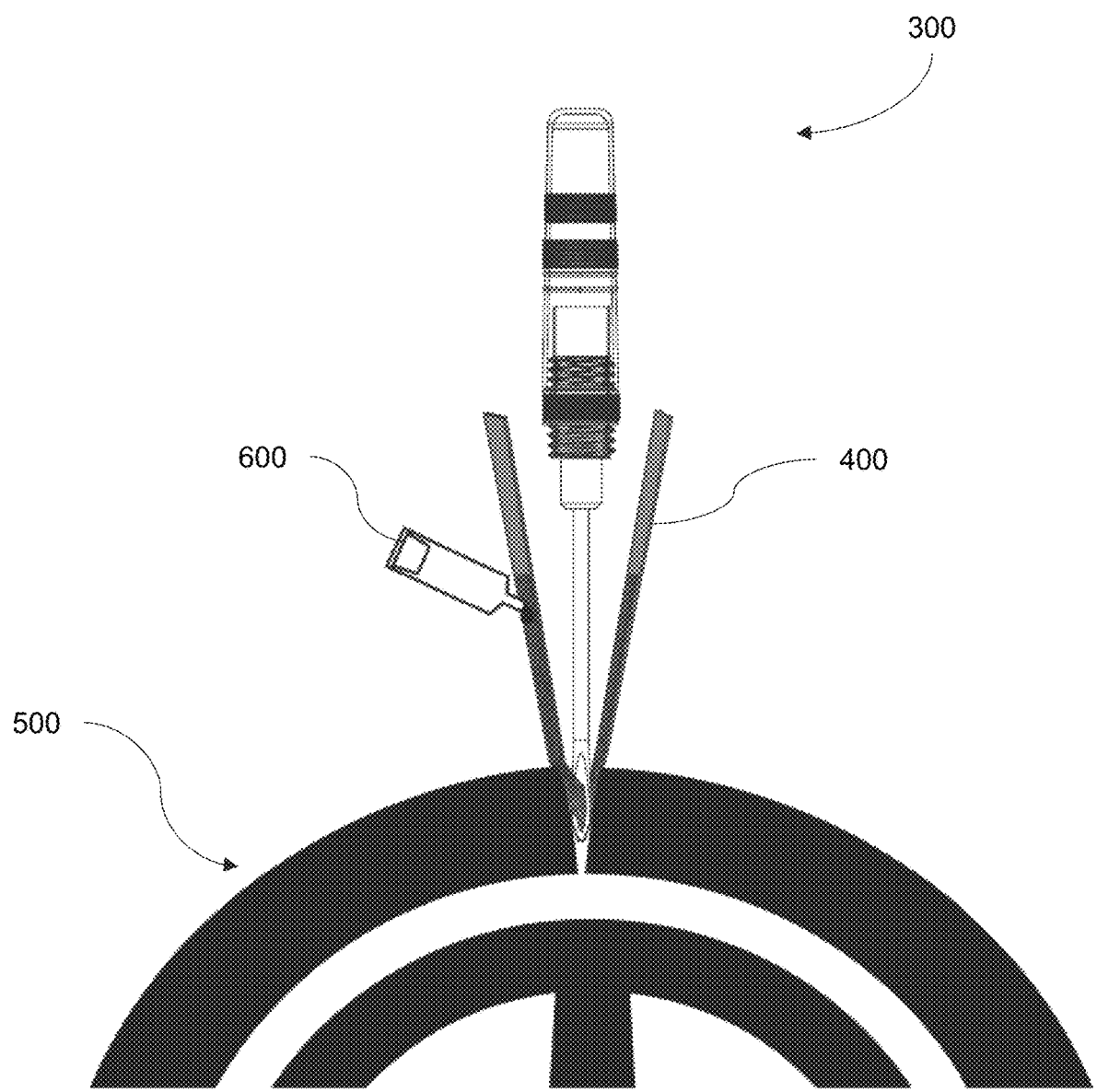
FIG. 7 illustrates a cross-sectional view of an insertion tool and plugging strip inserted within the receiving opening of the insertion tool and an initial step of applying the vulcanized rubber to the plugging strip.
Figure 8A:
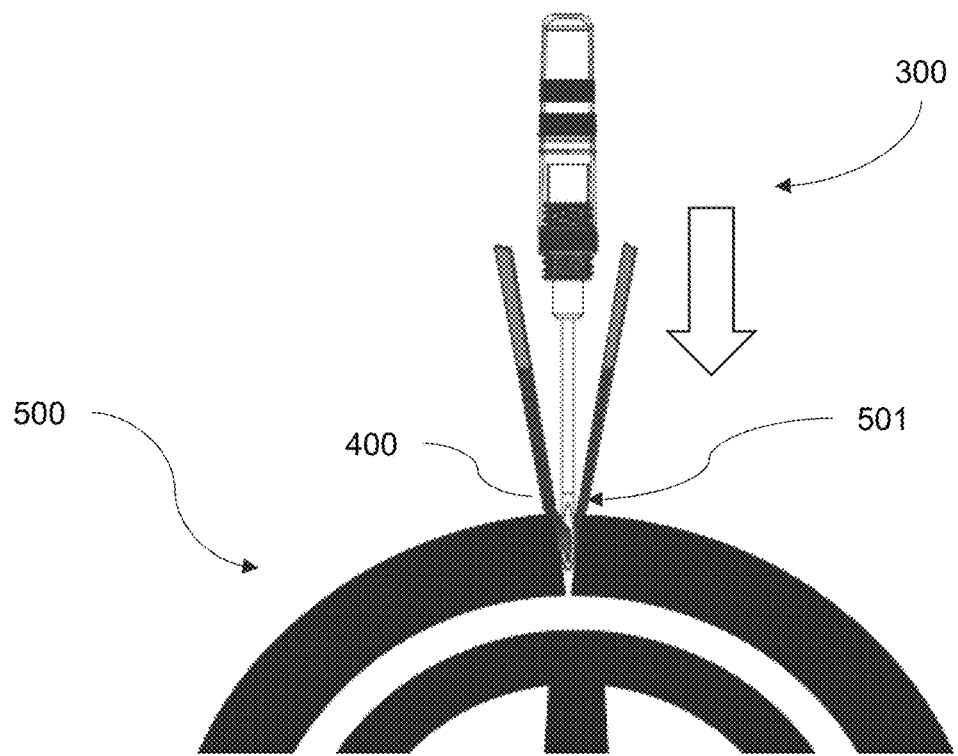
FIGS. 8A and 8B illustrates cross-sectional views of the insertion tool and plugging strip inserted within the receiving opening of the insertion tool and an initial step of being inserted into a puncture hole of a tire.
Figure 8B:
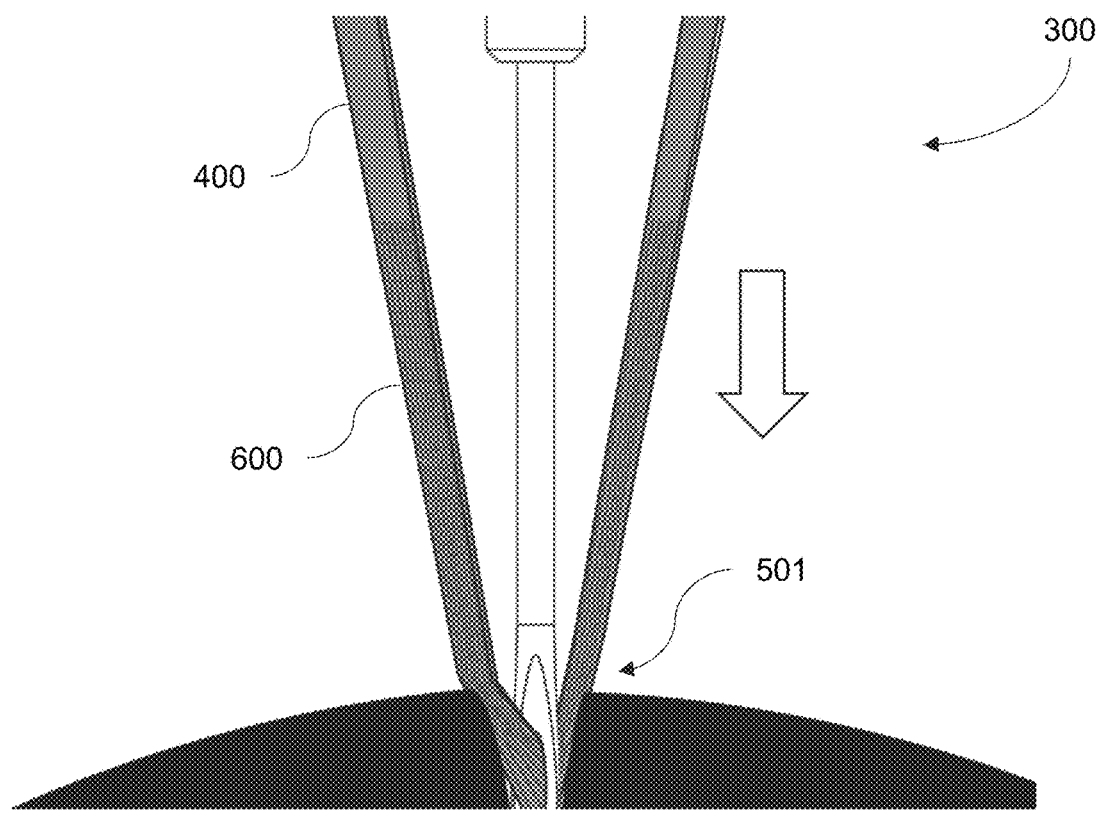
Figure 9:
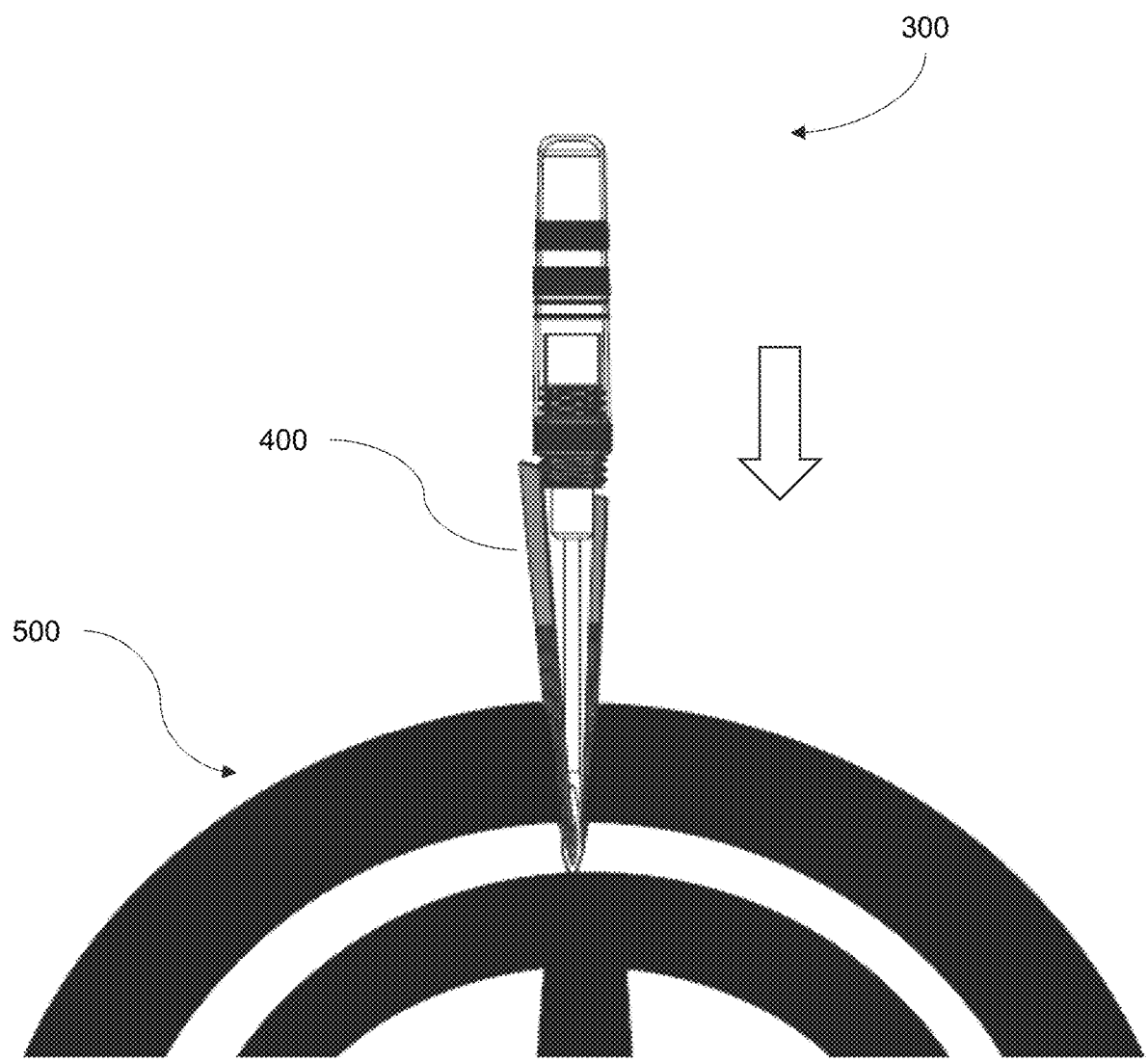
FIG. 9 illustrates a cross-sectional view of the insertion tool and plugging strip of FIG. 7 being fully inserted through the puncture hole and its position prior to the insertion tool being removed.
Figure 10:
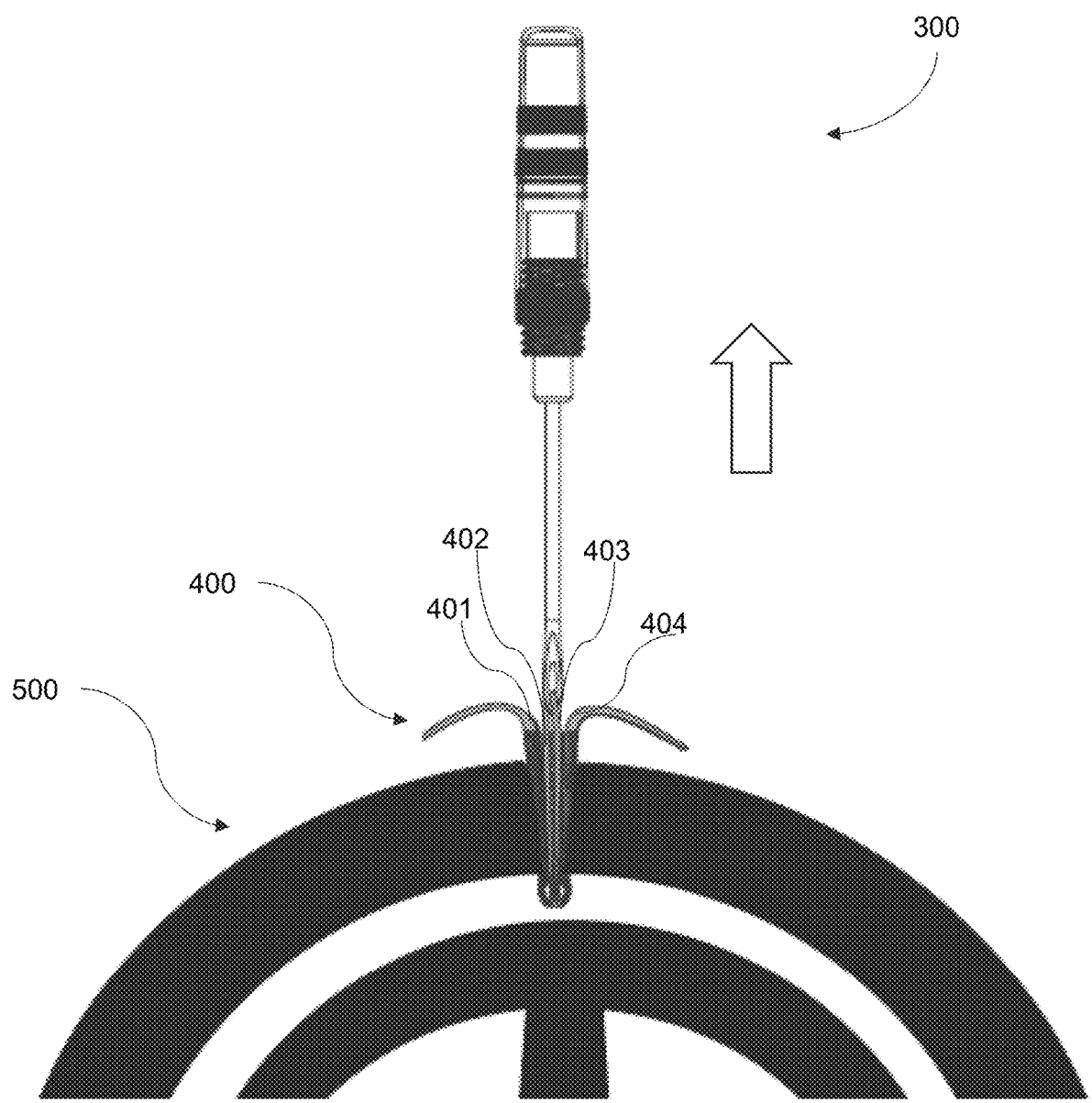
FIG. 10 illustrates a cross-sectional view of the insertion tool and plugging strip being pulled out from the puncture hole while leaving a portion of the plugging strip to remain in the puncture hole.

In the example of FIG. 5, each of the two elongated members 200 and 300 include repair tools affixed on each of the ends of the members. Each elongated tool member 200, 300 includes removable encasings 212, 222, 312 and 322 configured to cover and enclose a tool. The removable encasings cover each end of the elongated tool members thereby protecting the repair tools and increasing the ease of handling the kit. The elongated members can be referred to as "pens" and the encasings can be configured to define a continuous shell for improved aesthetics, storage, and manufacturability. The casings can be configured to open along a near central pivot point to access the covered tool.

As shown in FIGS. 2A, 2B, 3A, 3B and 4, a first elongated tool member 200 includes a knife 211 at one end and a reamer tool 221 at an opposite end. The knife 211 and the reamer 221 extend linearly and away from each other mounted on opposite ends of a central base 214. The reamer 221 is configured to clear debris from a puncture hole of a tire, and in some examples, the reamer is threaded to allow for maneuvering through a relatively tight puncture hole.

A second elongated tool member 300 includes an insertion tool 321 at one end, having a receiving opening 323, configured to insert a rubber plugging strip 400 therethrough. Insertion tool 321 is configured to insert the plugging strip 400 horizontally into a puncture hole thus allowing it to fold over onto itself and fill the puncture hole. A holding cavity 311 is provided on an opposite end configured to hold rubber plugging strips 400. The insertion tool 321 and the holding cavity 311 extend linearly and away from each other mounted on opposite ends of a central base 314. In an example, the insertion tool is of a closed fork design forming the receiving opening 323. In a further example, the insertion tool is of an open-type fork design. The plugging strips are made of pure rubber for improved interaction with the vulcanized rubber.

With reference now to the drawings, FIG. 1 illustrates a flow diagram 100 of the method and process of repairing a tire is shown. First, a user clears a puncture hole of a tire by removing any foreign object (if present) from the tire, as shown in box 101. The process advances to box 102 where a reamer is inserted into the puncture hole clearing any debris from the hole. Then, as shown in box 103, vulcanizing fluid is applied to the puncture hole and a plugging strip to ensure fluid coverage within the puncture hole. The vulcanizing fluid can be supplied in a dispensable tube as shown in kit 800. In another example, vulcanizing fluid can be applied to the plugging strip and puncture hole in the form of a spray. In yet another example, the vulcanizing fluid is vulcanizing cement, which is used to join rubber components, i.e., the rubber of the plugging strip and the rubber material of the tire. The vulcanizing cement is an adhesive that consists of elastic polymers that have been dissolved in a solution of toluene, acetone, benzene, chloroform, or heptane.

The method continues to box 104 where a pure rubber plugging strip is inserted into a receiving hole of an insertion tool. In this example, the insertion tool is a closed fork insertion tool. The plugging strip having at least some vulcanizing fluid is then inserted into the puncture hole with vulcanizing fluid using the insertion tool as shown in box 105. Once the plugging strip is firmly within the puncture, the insertion tool is carefully removed from the puncture hole while a portion of the plugging strip remains adhered to and within the puncture hole, as depicted in box 106. This causes the folding strip to double up onto itself thus fully occupying any open space and tightly fitting and filling the puncture hole. In box 107, the insertion tool is cut free from the plugging strip, using a knife, and the excess plugging strip material exposed from the puncture hole is also cut. Cutting the excess plugging strip from the outside of the tire helps prevent the plugging strip from interacting with foreign debris and potentially causing more danger and creating a more aesthetically pleasing seal.

In a further example, the present disclosure provides for a "T-shaped" tire repair kit (shown in FIG. 11) having and utilizing a vulcanizing fluid, a knife, a plugging strip, a T-shaped reamer tool and a T-shaped insertion tool. The plugging strip is made from pure rubber. The reamer tool and the insertion tool are configured in the shape of a "T" to aid the user's handling and utilization of the tools. To repair a puncture hole using the kit described, first, a user clears the puncture hole by removing the foreign object (if present) from the tire and inserts the T-shaped reamer tool through the opening of the hole to clear any debris in the opening. Then, the user inserts the plugging strip within a receiving opening of the T-shaped insertion tool and applies the vulcanizing fluid to the plugging strip and the puncture hole. In an example, the vulcanizing fluid is vulcanizing cement, which is used to join rubber components, i.e., the rubber plugging strip and the rubber material of the tire. The user then inserts the plugging strip into the puncture hole using the T-shaped insertion tool. Once the plugging strip is firmly within the puncture hole, the user carefully removes the T-shaped insertion tool from the puncture hole while the plugging strip remains adhered to the puncture hole. This causes the folding strip to double up onto itself thus fully occupying any open space and tightly fitting and filling the puncture hole. The user then cuts the excess plugging strip material with the knife.

Referring to FIGS. 2A-4, various depictions of the bilateral elongated tool members 200/300 are shown. A first elongated tool member 200 is configured with opposed linear ends defining a knife end 210 and a reamer end 220. Knife end 210 includes knife 211 which can be covered by a knife encasing 212 to protect both a user and the knife 211 from harm or damage when not in use. The knife is sufficiently sharp so as to cut through the plugging strip 400.

Reamer end 220 includes a reamer 221 and reamer encasing 222 to protect the user and the reamer from harm or damage when not in use. Reamer 221 and knife 211 can both be mounted on opposite ends of central base 214. A reamer can be defined as a tool that is typically used for widening or finishing holes. In this example, reamer 211 is a straight reamer whereby an entry end of the reamer is slightly tapered so that it self-centers upon entering the puncture hole. Once the reamer enters and leaves the puncture hole, it creates a hole of precise circularity and size that is sized and shaped to receive and hold the plugging strip. The reamer also pushes through any debris that may remain in the puncture hole. Debris in the puncture hole would disrupt the essential adhesion and bond of the plugging strip and puncture hole.

A second elongated tool member 300 is configured with opposed linear ends 310 and 320. In this embodiment, tool 300 includes a holding cavity end 310 and an opposite insertion end 320. The holding cavity end 310 includes an encasing 312 that, when attached to center base 314, forms a holding cavity 311. The holding cavity 311 is configured to hold a plurality of plugging strips 400. When the plugging strips are needed, the user removes the encasing 312 to access the holding cavity, and then reattaches the encasing to the center base to store the plugging strips. The holding cavity end 310 provides for ease of use and efficiency so that the plugging strips can be accessed and transported effectively while repairing the tire. The insertion end 320 includes insertion tool 321 housed by an insertion encasing 322 that can protect the user and the insertion tool from harm and damage when not in use.

Figure 3A:
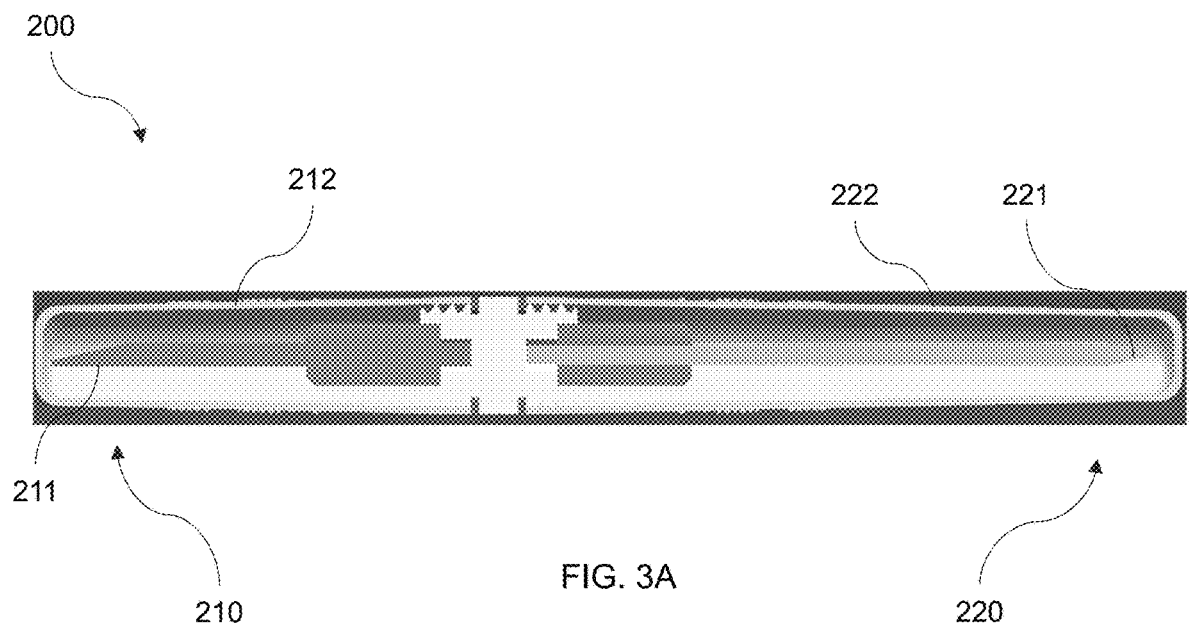
FIG. 3A illustrates a cross-sectional view of a first elongated repair tool with a reamer at a first end and a knife at a second opposite end wherein each end is housed within a protective encasing.

The insertion tool 321 is an elongated piece with a fork configuration at a tip portion defining a receiving opening 323. The fork can either be a closed fork (as shown in FIGS. 2B, 4, and 6-11) or an open fork (FIG. 3A). The open fork configuration creates two prongs 324 at a tip of insertion tool 321. The closed fork configuration creates an opening 323 near the tip of the insertion tool 321. Plugging strip 400, made of pure rubber, is elongated, and defines a thickness that slides within the receiving opening 323 of the insertion tool 321. In the open fork configuration, the user places a plugging strip across the puncture hole and inserts the insertion tool into the plugging strip forcing it into the puncture hole horizontally. The rubber plugging strip should be flexible and configured to fold into the puncture hole. The user then removes the insertion tool causing the rubber plugging strip to partially remain within the puncture hole. The knife is used to cut excess plugging strip away, creating a two-layered seal of plugging strip in the puncture hole.

In a closed fork configuration, a user inserts the plugging strips 400 within the receiving opening 321 when inserting into a puncture hole (See FIGS. 6, 7, 8A, 8B and 9). Prior to insertion, the user applies vulcanizing fluid (not shown) to the plugging strips 400 and puncture hole. The user then carefully pulls out the insertion tool 321 (FIG. 10) so that the middle of the plugging strip 400 pulls back out while a middle portion of the plugging strip remains within the puncture hole. This creates a four-layered seal across the puncture hole. The configuration four-layered seal creates a tighter, stronger, and more effective seal of the puncture hole. The knife is then used to cut away the plugging strip from the receiving opening 323 and the excess plugging strip protruding from the puncture hole. This can prevent the plugging strip from interacting with foreign debris and creating a more aesthetically pleasing seal.

FIG. 5 illustrates an example kit 800 shown in dotted lines. Kit 800 can be provided in a casing, like a hard case or a bag. The kit 800 includes a pair of elongated tool members 200 and 300, a dispensable tube of vulcanized rubber 600 and rubber plugging strips 400. In an example, the kit 800 includes T-shaped tools rather than the "pen" configurations shown. In yet another example, vulcanized rubber is provided in a spray. In this example, the encasings of the "pen" design provides for efficient, sleek, and convenience for accessing the necessary tools. This increases the ease of a user's handling and transport of the elongated tool members when not in use. In an example, the first and second elongated tool members are about the size of an average pen, or about 130 mm in length and about 12 mm in diameter.

FIGS. 6-11 illustrate various cross-sectional views of the second elongated tool member 300 engaged with plugging strip 400. Plugging strip 400 is relatively flat rectangular strip of pure rubber and can be stored in holding cavity 311. Plugging strip 400 defines a thickness and width configured to fit through an opening 323 of a closed fork configuration of insertion tool 321. A vulcanizing fluid 600 is applied to the plugging strip 400 and a puncture hole 501 of a tire 500 so as to create adhesion between the strip 400 and puncture hole 501 when the strip 400 is inserted. When the plugging strip is positioned in the opening of the insertion tool, the user inserts the insertion tool 321 within puncture hole 501. Once insertion tool 321 passes through tire 500, the insertion tool 321 is carefully pulled back out from the puncture hole 501. The vulcanizing fluid causes the portions of the plugging strip 400 and puncture hole 501 that are in contact to adhere and remain engaged while the insertion tool 321 and a middle portion of the plugging strip 400 is pulled back through the puncture hole 501. This creates a four-layered (layers 401, 402, 403, 404) seal of the plugging strip 400 across the puncture hole 501 for increased strength and durability of the repair. In order to free insertion tool 321 from plugging strip 400, knife 211 is used to cut the plugging strip sections 401, 402, 403, and 404 thus allowing portions of the strip to remain within the puncture hole 501. Knife 211 from tool 200 can be used to cut away the excess plugging strip 400 protruding from puncture hole 501 as close to the intersection of tire 500 and strip 400 as possible so as to prevent the excess strips from interacting with foreign debris and creating a more aesthetically pleasing seal.

Figure 3B:
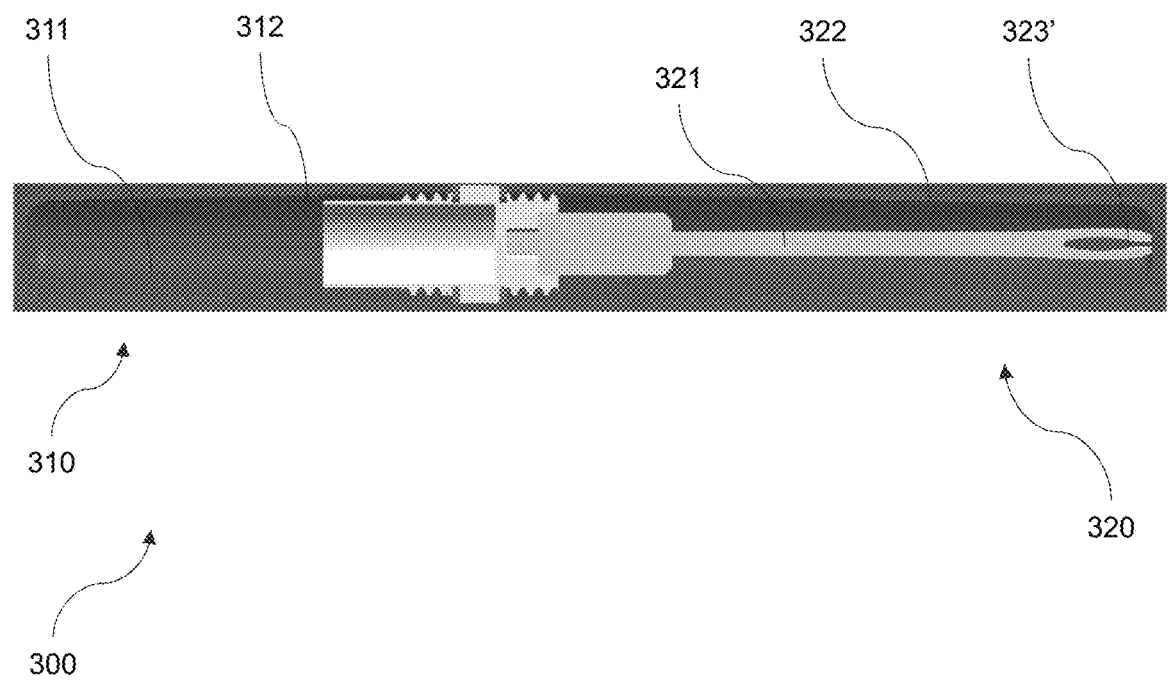
FIG. 3B illustrates a cross-sectional view of a second elongated repair tool with an open cavity to house plugging strips and an insertion tool at an opposite end, each end housed within a protective encasing.
Figure 4:
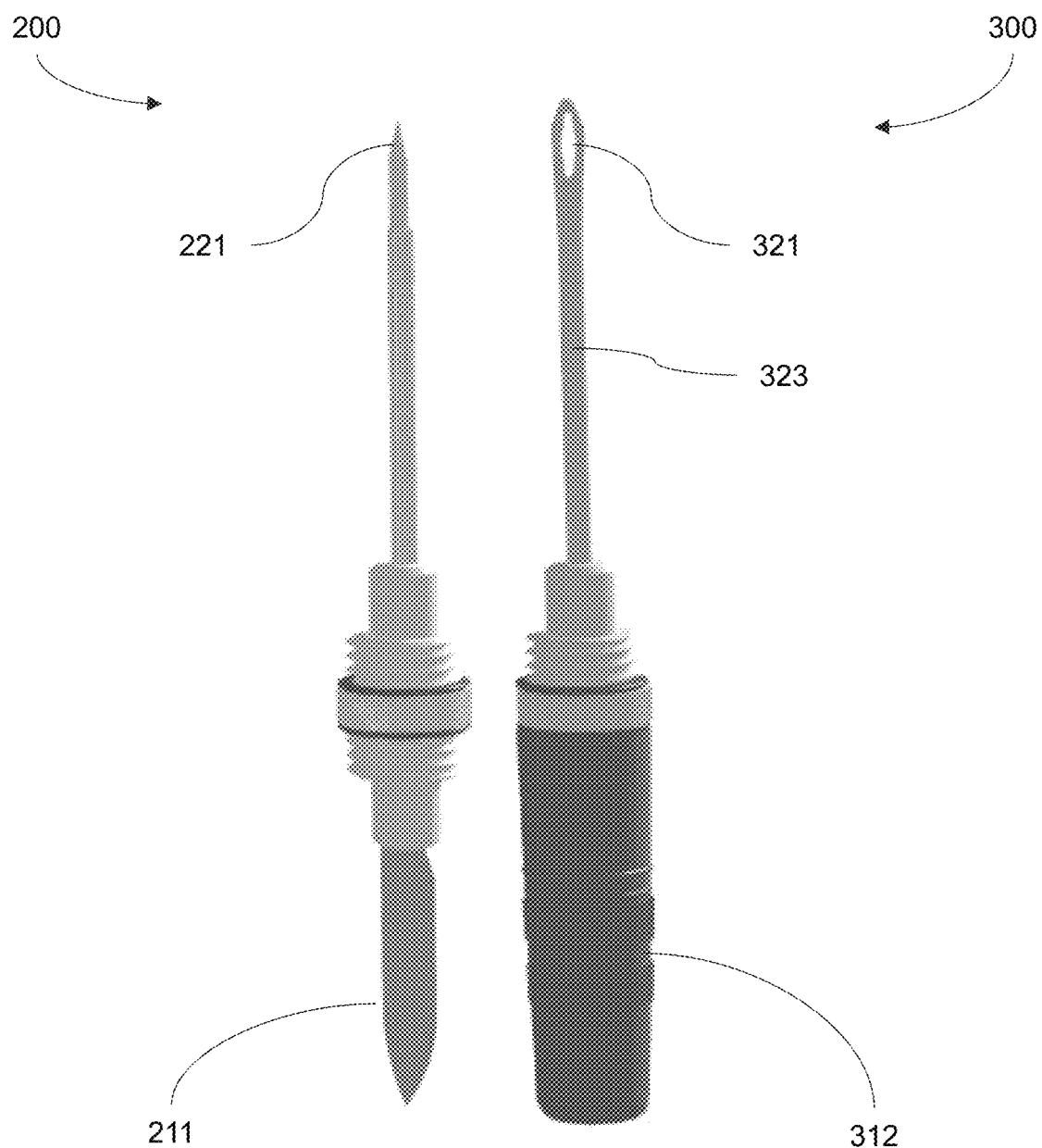
FIG. 4 illustrates a side view of the two elongated tool members configured with the repair tools on each end without the protective encasings.

In another example, the insertion tool is designed with an open fork configuration as shown in FIG. 3B at 323', whereby the user places plugging strip 400 across the puncture hole 501 and inserts the insertion tool through the plugging strip and into the puncture hole 501. The user can then remove the insertion tool and then cut the excess plugging strip away, creating a two-layered seal of plugging strip in the puncture hole. The user then utilizes knife 211 to cut away the excess plugging strip material that protrudes from puncture hole 501.

Figure 11:
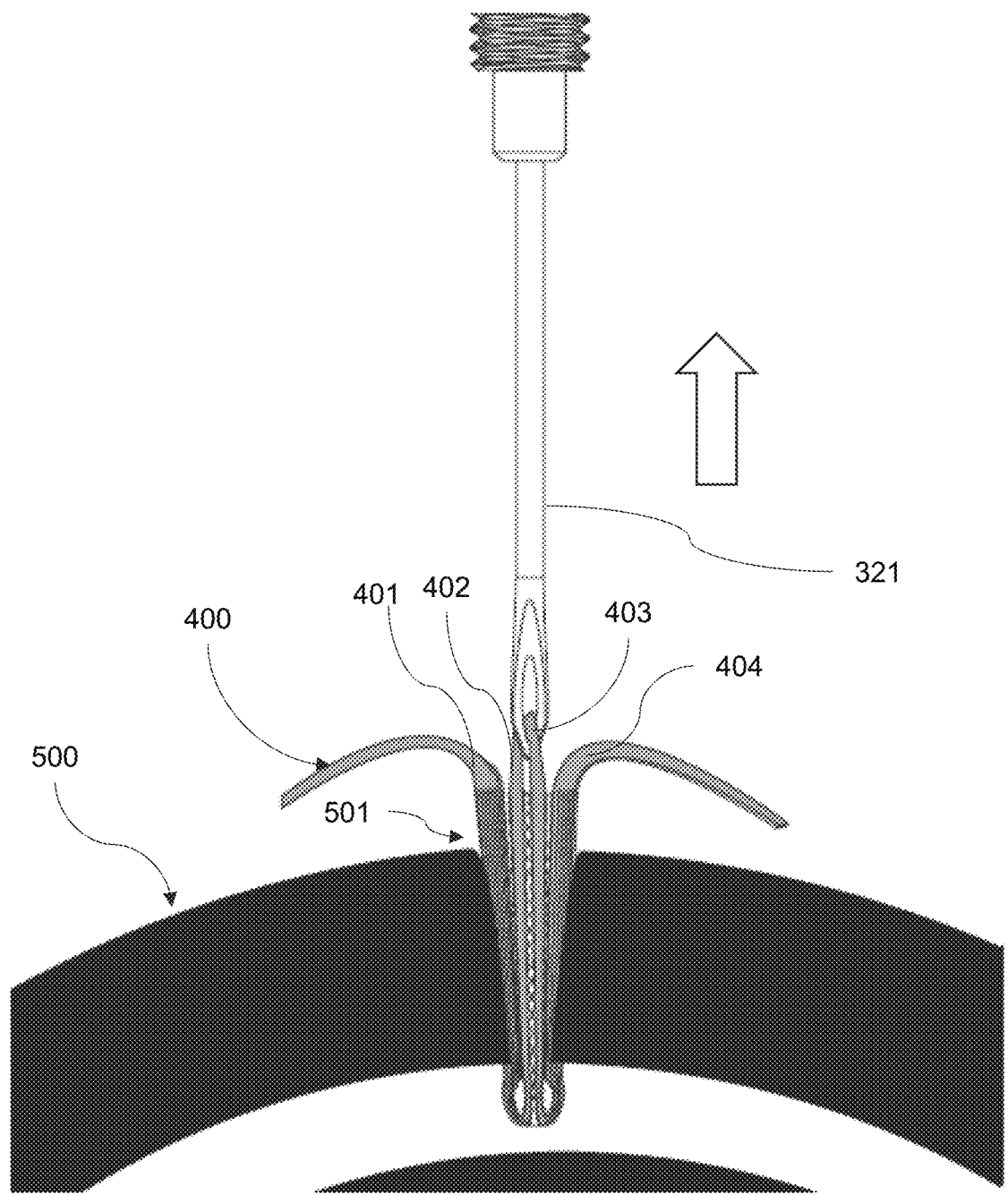
FIG. 11 illustrates an enlarged view of FIG. 10 with the insertion tool removed from the puncture hole and the plugging strip folded onto itself within the puncture hole.
Figure 12:
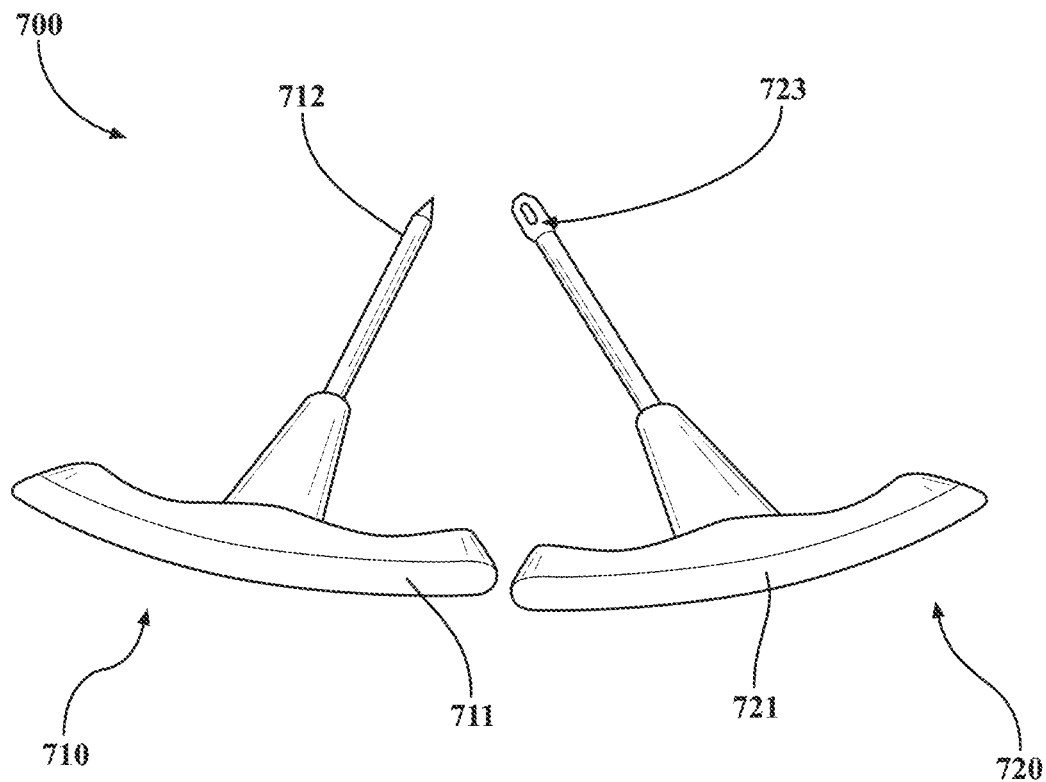
FIG. 12 illustrates a cross-sectional view of a T-shaped insertion tool and T-shaped reamer tool.

Vulcanizing fluid 600 of FIG. 5 can be provided in a tube with a twist-off cap. In another example, the vulcanizing fluid 600 can be in the form of a spray. Vulcanizing fluid or "vulcanizing cement" is an adhesive that is used in making cross-links in materials made of rubbers that fast dry with or without the use of heat. Vulcanizing cement is an adhesive that consists of elastic polymers that have been dissolved in a solution of toluene, acetone, benzene, chloroform, or heptane. Vulcanizing fluid 600 can applied to both plugging strip 400 and puncture hole 501. In order to apply vulcanizing fluid 600 to the inside of puncture hole 501, the user can apply the vulcanizing fluid to the surface of the puncture hole and insert reamer 221 into the hole thereby spreading the vulcanizing fluid 600 along an inner surface of the puncture hole 501. Alternatively, the user can apply the vulcanizing fluid 600 to the tip of the reamer 221 and insert the reamer 221 into the puncture hole 501. In an example, plugging strip 400 is made of pure rubber so as to better interact with the vulcanizing fluid and puncture hole. When plugging strip 400 is inserted inside puncture hole 501 through the use of insertion tool 321, the plugging strip and puncture hole interact with each other due to the vulcanizing fluid so as to create a fast-acting adhesive and bonded materials. The adhesion of the plugging strip and puncture hole is sufficiently strong so as to remain intact when the insertion tool and middle of the plugging strip is pulled back through the puncture hole. Once the insertion tool has been cut free from the plugging strip, a four-layered seal of plugging strip remains within the puncture hole (FIG. 11). In a further example, the user can apply additional vulcanizing fluid 600 to the four-layered seal to increase strength and durability of the seal.

Referring to FIG. 11, a perspective view of a T-shaped tire repair tools 710 and 720 are shown having a reamer tool 710 and an insertion tool 720. Reamer tool 710 and insertion tool 720 are configured in the shape of a "T" for manual handling the "T" portion to maneuver the tool at the opposite end. Reamer tool 710 is configured with a reamer 712 placed on the opposite end of a "T" handle 711. Insertion tool 720 is configured with a closed fork insertion tool 723 on the opposite end of a "T" handle 721. In a further example, insertion tool 720 is configured with an open fork insertion tool (not shown). To repair a tire puncture hole using the kit described, first, debris is cleared from the puncture hole by removing the foreign object (if present) from the tire, and then inserts reamer tool 712 through the opening of the hole to clear any debris in the opening. Then, vulcanizing fluid is applied to the plugging strip and the puncture hole and inserts the plugging strip within a cavity of insertion tool 723. The plugging strip is then inserted into the puncture hole using insertion tool 722. Once the plugging strip is firmly within the puncture, the insertion tool is removed from the puncture hole while the plugging strip remains within the puncture hole. With the use of a knife, the insertion tool is "cut free" from the plugging strip in the cavity and further cuts the excess plugging strip protruding from the puncture hole.

Figure 13:
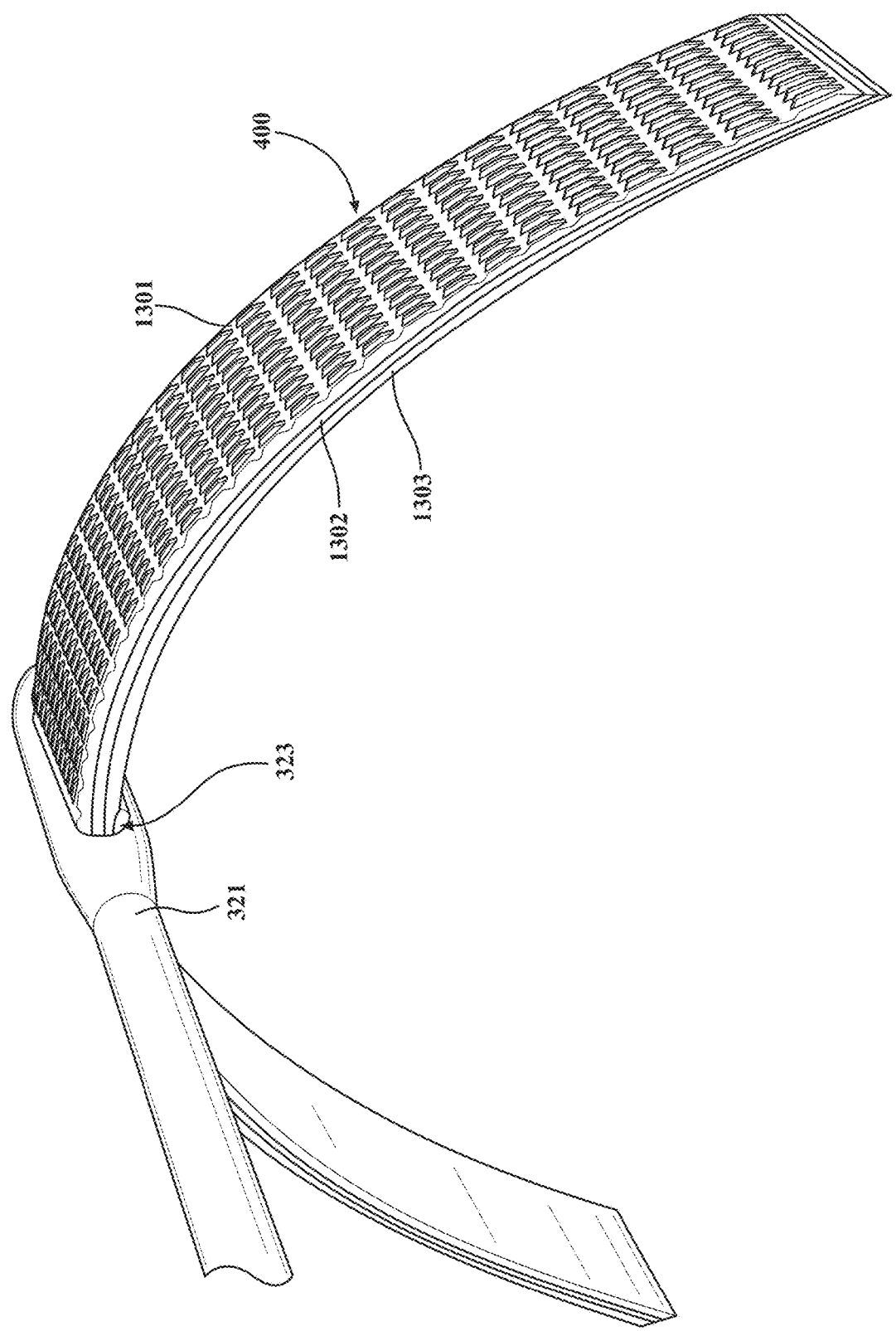
FIG. 13 illustrates an example insertion tool with a tri-layer strip.
Figure 14:
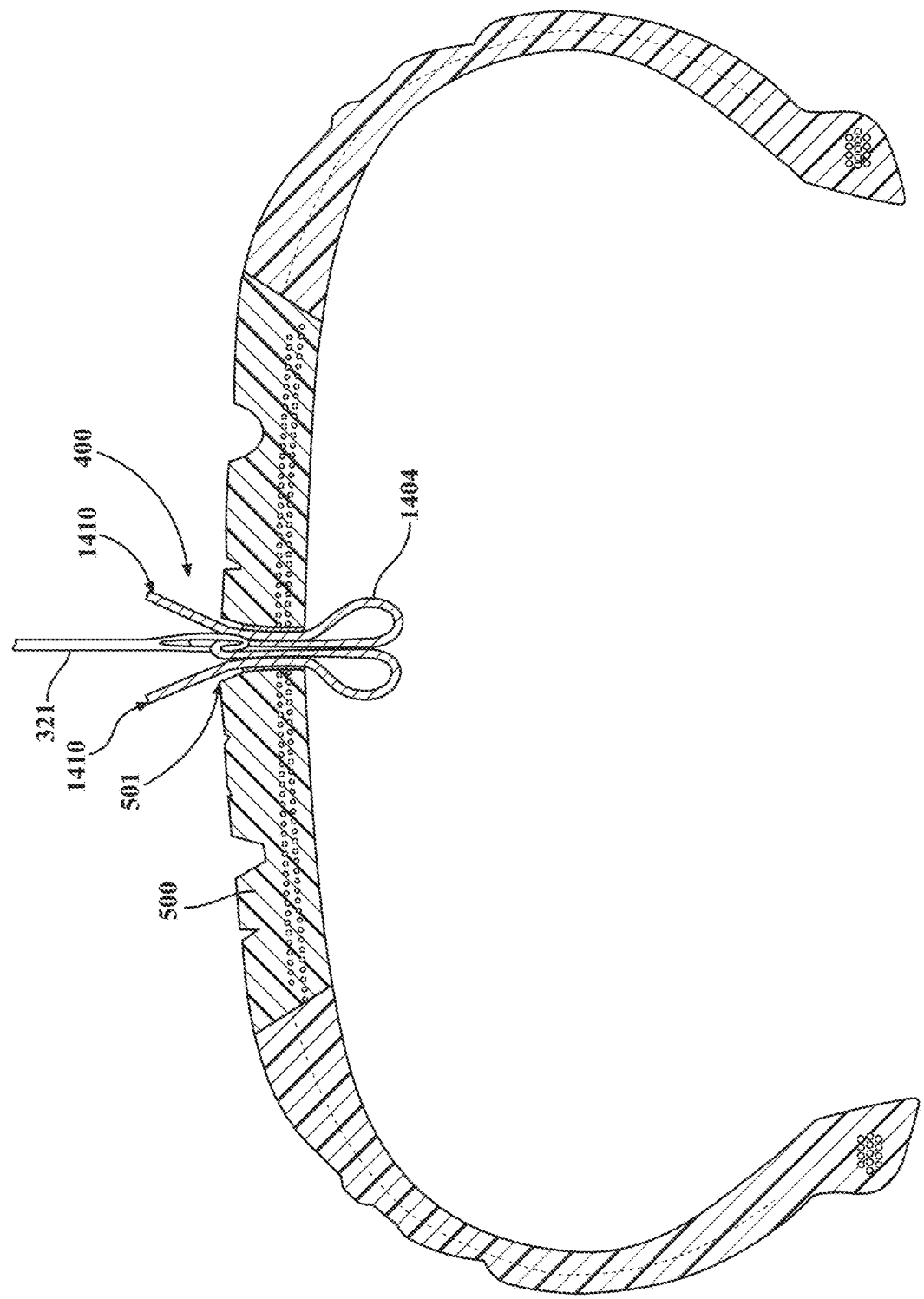
FIG. 14 illustrates a cross-section view of an insertion tool and the tri-layer strip from FIG. 13 being pulled out from a puncture hole of a tire, while leaving a portion of the tri-layer plugging strip to remain in the puncture hole.

Referring to FIGS. 13-14, in yet another example, plugging strip 400 may be formed as a multi-layer strip, wherein each layer defines a desired characteristic to help ensure a functional and secure plugging of a puncture hole. Tri-layer strip 400 is shown having a first layer 1301, a second layer 1302, and a third layer 1303. The layers are integrally formed as a unified component. In an example, first layer 1301 and third layer 1303 include or are formed of vulcanized rubber configured to be soft and react rapidly with vulcanizing fluid to form a bond. Second layer 1302 is provided between the first layer 1301 and third layer 1303 and includes or is formed of tensile rubber. Second layer 1302 provides structural support for tri-layer strip 1300 during use while maintaining flexibility to allow for double folding during insertion and withdrawal of insertion tool 321.

The tri-layer strip 400 is sized and shaped to a thickness sufficient to easily insert into a receiving opening 323 of insertion tool 321 for use with a puncture hole 501. The length of each strip 400 is sized and shaped to securely fit within a kit of the present disclosure (See FIG. 5) and/or an encasing 312 and a corresponding cavity 311. In another example, a plurality of tri-layer strips 400 are provided in a kit or encasing 312 and each of the plurality of tri-layer strips 400 defines identical or similar thickness, width, and length.

During use, the tri-layer strip 400 is inserted into a tire 500 using insertion tool 321. A center portion 1404 of tri-layer strip 400 is pushed through a puncture hole 501 with end portions 1410 remaining on an exterior side of tire 500. Insertion tool 321 is t then pulled back out to cause the center portion 1404 of tri-layer strip 400 to fold back on itself inside tire 500 creating a plug and essentially filling and hence "plugging" puncture hole 501. The folding-over forms four overlapping layers of the center portion 1404 of tri-layer strip 400 within puncture hole 501.

Prior to insertion, vulcanizing fluid can be applied to the tri-layer strip 400 and applied to puncture hole 501. During insertion of the treated tri-layer strip 400, a chemical reaction occurs which forms a fast-acting adhesive and creates a permanent bond between tri-layer strip 400 and tire 1400. The adhesion is sufficiently strong to secure the tri-layer strip 400 within the puncture hole 501 in the four-layer folded over configuration and bonded to the tire 500. This creates a four-layered seal across the puncture 501 hole which provides a tighter, stronger, and more effective seal of the puncture hole 501. A knife or other cutting tool may then be used to cut away end portions or otherwise of tri-layer strip 400 that do not remain in the puncture hole 501.

In another example, second layer 1302 of tri-layer strip 1300 includes a soft and flexible rubber which facilitates insertion of the tri-layer strip 400 into the puncture hole 501. Second layer 1302 can be configured to be flexible enough to be pushed into puncture hole 501 by the insertion tool 321 and fold back onto itself when the insertion tool 321 is withdrawn or pulled out from the puncture hole 501. The soft and flexible rubber of second layer 1302 may also make cutting away excess portions and releasing insertion tool 321 easier and less likely to disturb the vulcanizing fluid as it bonds the tri-layer strip 400 to the tire 500.

Figure 15:
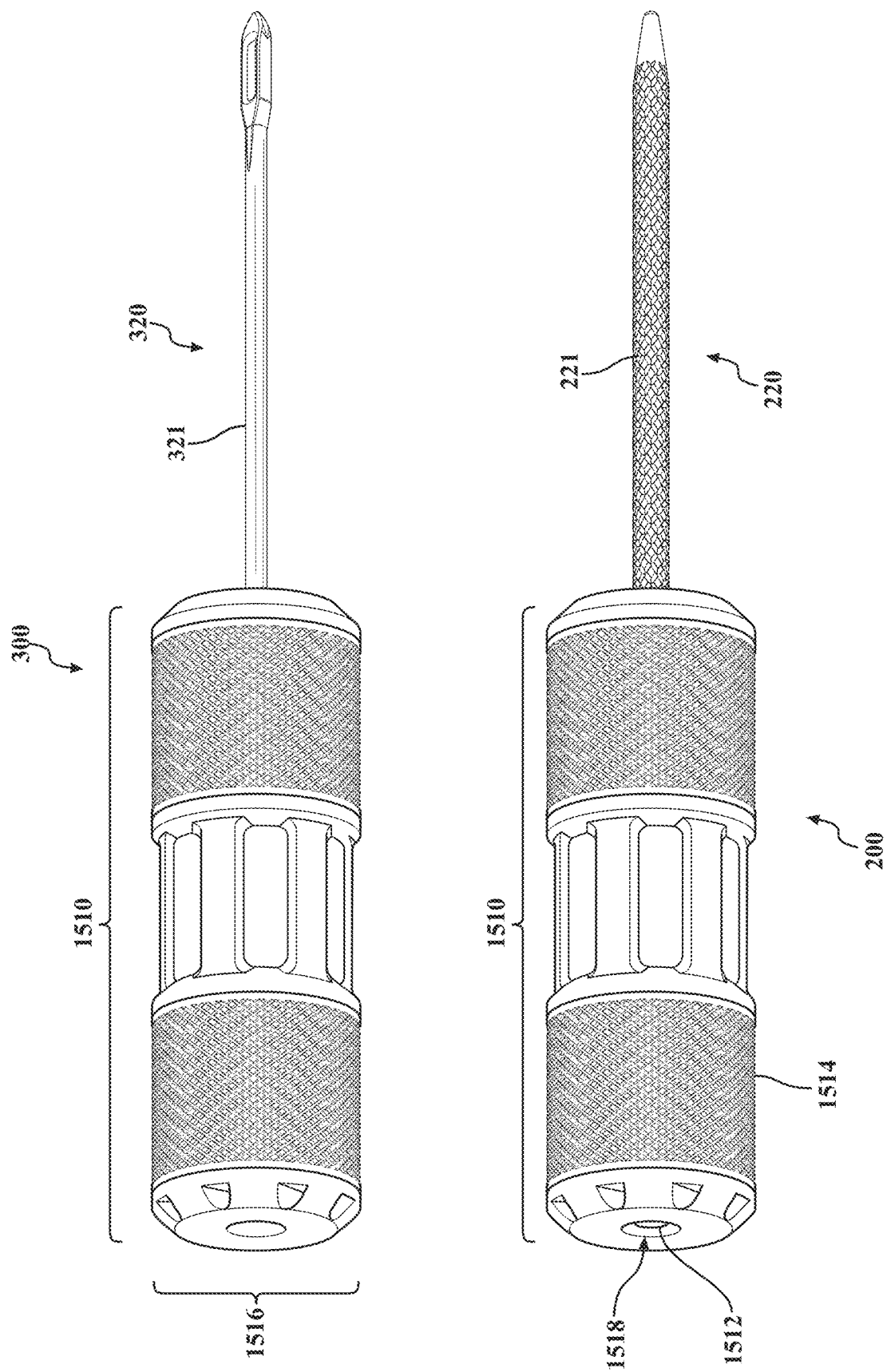
FIG. 15 illustrates an example insertion tool and reamer tool with a grip.
Figure 16:
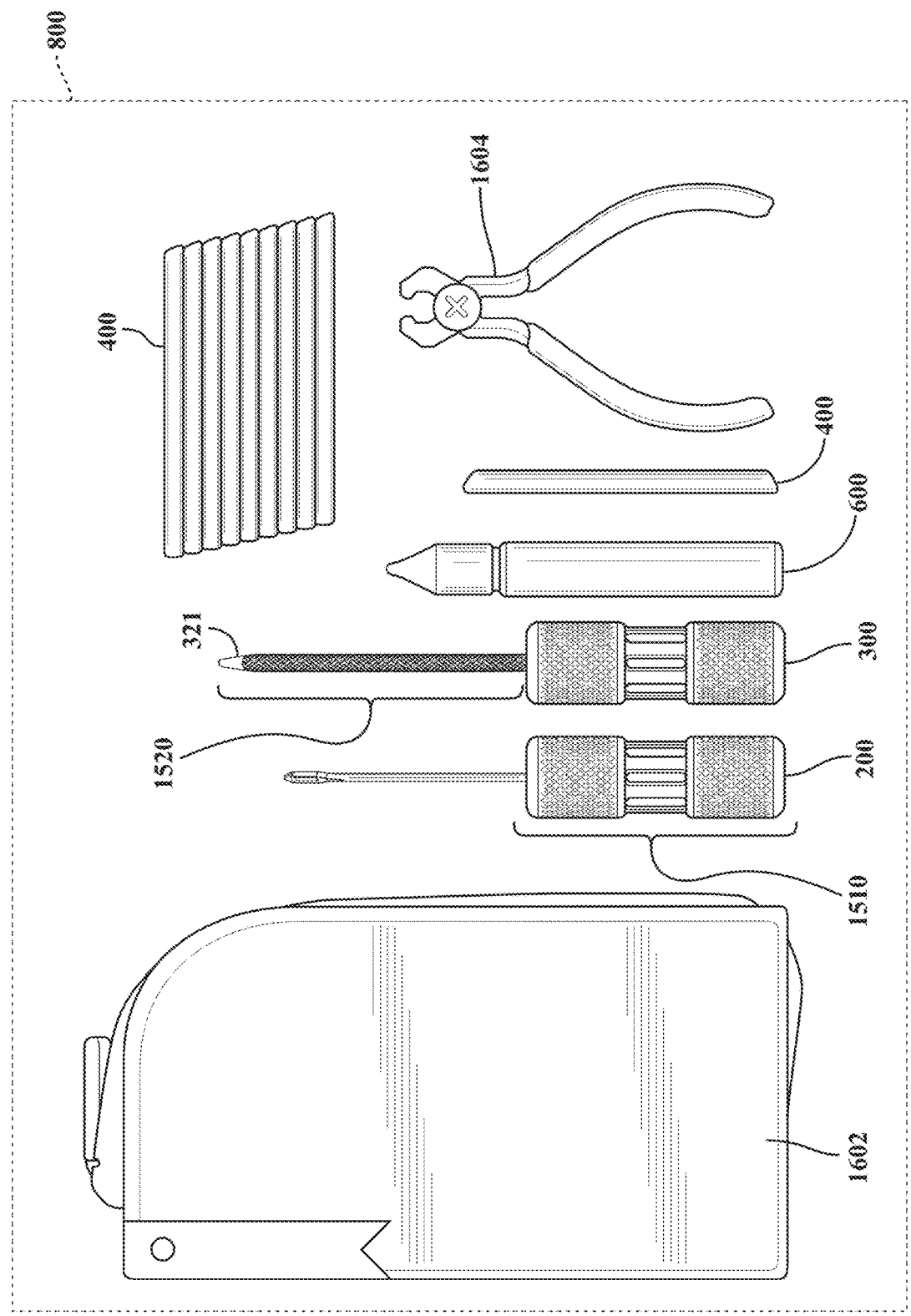
FIG. 16 illustrates an example tire repair kit including the insertion tool and reamer tool of FIG. 15.

Referring to FIGS. 15-16, in another example, bilateral elongated tool members 200/300 are shown. First and second bilateral elongated tool members 200 and 300 are configured with a handle 1510 and a tool 1520 extending from the handle. Handle 1510 includes a valve core remover 1512, a handle grip 1514 and a handle base 1516. In this example, valve core remover 1512 is positioned within a recessed hole 1518 defined by handle base 1516 of tool 200. Handle grip 1514 can be sized and shaped for ease of grasping and handling during use. Handle grip 1514 may also be wrapped with a rubber or another tactile surface to increase grip for a user's hand.

In this example, tool 220 is a reamer 221 which may be used to widen or finish holes of tires. The second elongated tool member 300 includes an insertion tool 321 extending linearly from handle 1510 of tool 300.

Referring to FIG. 16, in another example, tire kit 800 includes first elongated tool member 200, second elongated tool member 300, a carrying pouch 1602, one or more plugging strips 400, vulcanizing fluid 600, and pliers/cutting tools 1604. In this example, carrying pouch 1602 is constructed to be large enough to carry all the other items included in the kit 800. Carrying pouch 1602 may include a zipper, a hook and loop fastener, buttons, or crimps to close the pouch 1602 and secure the tools 200, 300, strips 400, fluid 600, and pliers/cutting tool 1604. Tool 1604 is used as a tool to remove any material or object that remains within a puncture hole of a tire. After repair, tool 1604 may be used to cut excess portions of plugging strip 400 and releasing the insertion tool 321.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for repairing a tire comprising:
   (a) providing a reamer, an insertion tool, a rubber tri-layer strip, and vulcanizing fluid;
   (b) inserting the reamer into a puncture hole of the tire configured to clear the puncture hole of any debris and to generate rougher surface to increase surface area within the puncture hole to receive and bond the vulcanizing fluid;
   (c) applying the vulcanizing fluid to the puncture hole and the tri-layer strip;
   (d) inserting the tri-layer strip into the receiving opening of the insertion tool;
   (e) inserting the insertion tool with the tri-layer strip into the puncture hole to cause the tri-layer strip to fold into the puncture hole mixed with the vulcanizing fluid to bond the tri-layer strip and the tire; and
   (f) removing the insertion tool from the puncture hole causing a center portion of the tri-layer strip to fold forming a four-layer seal within the puncture hole;
   wherein the vulcanizing fluid causes an immediate reaction to bond the tri-layer strip to the tire;
   wherein the tri-layer strip comprises a first layer and third layer formed of a soft vulcanized rubber; a second layer formed of a tensile rubber configured to structurally support the first layer and third layer and provided there between; and
   wherein the first layer and third layer react with the vulcanizing fluid to form a permanent bond between the tri-layer strip and the tire.

2. The method of claim 1, further comprising the steps of providing a cutting tool, wherein the cutting tool and the reamer are provided on opposite ends of a bilateral elongated tool member extending linearly away from each other from a center base of the bilateral elongated tool member and each of the cutting tool and the reamer are enclosed in a removable protective encasing.

3. The method of claim 2, wherein each end of the bilateral tool member includes a removable protective encasing.

4. The method of claim 1, further comprising the steps of cutting the tri-layer strip after the insertion tool removal step to form four layers plugging the puncture hole to form a secure plug within the puncture hole.

5. The method of claim 1, wherein the vulcanizing fluid is an adhesive comprising elastic polymers dissolved in a solution of a member selected from the group consisting of toluene, acetone, benzene, chloroform, heptane, and combinations thereof.

6. The method of claim 1, wherein the vulcanizing fluid is provided in a dispersion tube.

7. The method of claim 1, wherein the vulcanizing fluid is provided in a spray bottle and applied to the tri-layer strip and puncture hole by spraying the vulcanizing fluid.

8. The method of claim 1, wherein the reamer extends linearly away from a first end of a center base of a bilateral elongated tool member and a cavity encasing extends linearly away from a second end of the center base of the bilateral elongated tool member in an opposite direction from the reamer configured for housing a plurality of rubber tri-layer strips and wherein the first elongated tool member and second elongated tool member each include a removable protective encasings.

9. The method of claim 8, wherein the bilateral elongated tool member is configured to be 130 mm in length and 12 mm in diameter.

10. The method of claim 1, wherein the vulcanizing fluid is applied to the four-layer seal in the puncture hole.

11. The method of claim 1, wherein the insertion tool includes a closed-fork tip.

* * * * *